(12) United States Patent
Keeler et al.

(10) Patent No.: US 9,348,747 B2
(45) Date of Patent: May 24, 2016

(54) SOLID STATE MEMORY COMMAND QUEUE IN HYBRID DEVICE

(71) Applicant: Seagate Technology LLC, Cupertino, CA (US)

(72) Inventors: Stanton MacDonough Keeler, Longmont, CO (US); Margot Ann LaPanse, Superior, CO (US)

(73) Assignee: Seagate Technology LLC, Cupertino (*) Notice: Subject to any disclaimer, the term of this patent is extended or adjusted under 35 U.S.C. 154(b) by 131 days.

(21) Appl. No.: 14/066,266

(22) Filed: Oct. 29, 2013

(65) Prior Publication Data

US 2016/0011966 A1    Jan. 14, 2016

(51) Int. Cl.
*G06F 12/00*      (2006.01)
*G06F 12/02*      (2006.01)
*G06F 12/08*      (2016.01)
*G06F 12/10*      (2016.01)

(52) U.S. Cl.
CPC ........ *G06F 12/0246* (2013.01); *G06F 12/0873* (2013.01); *G06F 12/10* (2013.01)

(58) Field of Classification Search
CPC .. G06F 12/0246; G06F 12/0873; G06F 12/10
USPC ........................................................ 711/103
See application file for complete search history.

(56) References Cited

U.S. PATENT DOCUMENTS

| 5,420,998 | A  | * | 5/1995  | Horning ......................... 711/113 |
| 6,704,835 | B1 |   | 3/2004  | Garner |
| 8,176,238 | B2 |   | 5/2012  | Yu |
| 9,009,396 | B2 | * | 4/2015  | Nemazie ............ G06F 12/0246 707/639 |
| 2005/0172074 | A1 | * | 8/2005  | Sinclair ......................... 711/114 |
| 2010/0262979 | A1 |   | 10/2010 | Borchers |
| 2012/0204008 | A1 |   | 8/2012  | Dockser |
| 2012/0210041 | A1 | * | 8/2012  | Flynn et al. ........................ 711/3 |
| 2013/0054880 | A1 |   | 2/2013  | Chang |
| 2013/0326113 | A1 | * | 12/2013 | Wakrat ................ G06F 12/0868 711/103 |

\* cited by examiner

*Primary Examiner* — Prasith Thammavong
(74) *Attorney, Agent, or Firm* — Cesari & Reed, LLP; Kirk A. Cesari; Christian W. Best

(57) ABSTRACT

Systems and methods are disclosed for improving performance in of storage device latency. In an embodiment, an apparatus may comprise a controller configured to receive a first data access command at a device including a nonvolatile solid state memory and a disc memory, and when the first data access command is directed to the nonvolatile solid state memory, store the first data access command to a first command queue for the nonvolatile solid state memory. In another embodiment, a method may comprise receiving, at a data storage device, a first data access command, storing the first data access command in a first command queue, determining whether the data access command is directed to a Flash memory or a disc memory, and storing the first data access command in a second command queue when the first data access command is directed to the Flash memory.

9 Claims, 7 Drawing Sheets

SOLID STATE MEMORY COMMAND QUEUE IN HYBRID DEVICE

BACKGROUND

This disclosure relates to data storage devices (DSDs), and particularly to DSDs employing solid state memory.

SUMMARY

In an embodiment, an apparatus may comprise a controller configured to receive a first data access command at a device including a nonvolatile solid state memory and a disc memory, and when the first data access command is directed to the nonvolatile solid state memory, store the first data access command to a first command queue for the nonvolatile solid state memory.

In another embodiment, a memory device may store instructions that cause a processor to perform a method comprising receiving a first data access command at a data storage device including a cache memory, and storing the first data access command to a first command queue for the cache memory when the first data access command is directed to the cache memory.

In another embodiment, a method may comprise receiving, at a data storage device, a first data access command, storing the first data access command in a first command queue, determining whether the data access command is directed to a Flash memory or a disc memory, and storing the first data access command in a second command queue when the first data access command is directed to the Flash memory.

DETAILED DESCRIPTION

In the following detailed description of the embodiments, reference is made to the accompanying drawings which form a part hereof, and in which are shown by way of illustration of specific embodiments. It is to be understood that other embodiments may be utilized and structural changes may be made without departing from the scope of the present disclosure. It is also to be understood that features of the various embodiments can be combined, separated, exchanged, or removed without departing from the scope of the present disclosure.

Figure 1:
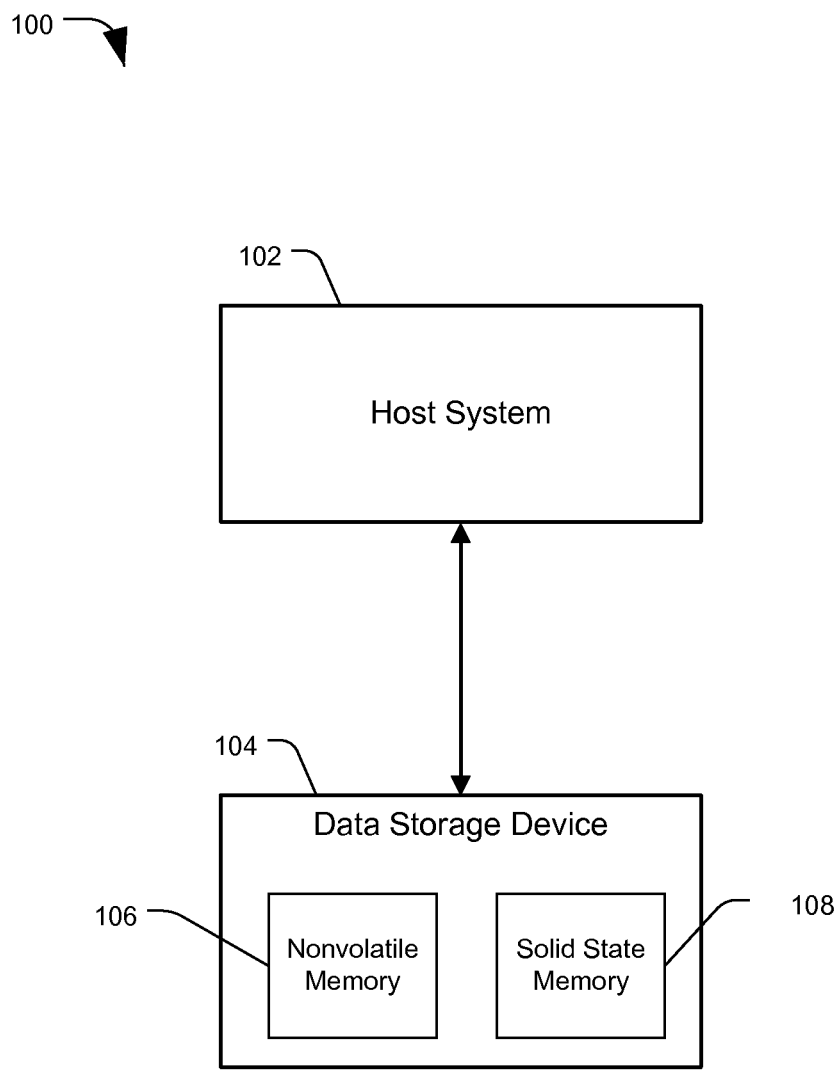
FIG. 1 is a diagram of an illustrative embodiment of a system including a solid state memory command queue in a hybrid device.

FIG. 1 depicts an embodiment of a system including a solid state memory command queue in a hybrid device, generally designated 100. The system 100 may include a host 102 and a data storage device (DSD) 104. The host 102 may also be referred to as the host system or host computer. The host 102 can be a desktop computer, a laptop computer, a server, a tablet computer, a telephone, a music player, another electronic device, or any combination thereof. Similarly, the DSD 104 may be any of the above-listed devices, or any other device which may be used to store or retrieve data. The host 102 and DSD 104 may be connected by way of a wired or wireless connection, or by a local area network (LAN) or wide area network (WAN). In some embodiments, the DSD 104 can be a stand-alone device not connected to a host 102, or the host 102 and DSD 104 may both be part of a single unit.

The DSD 104 may include a nonvolatile memory 106 and solid state memory 108. The nonvolatile memory 106 may comprise magnetic storage media such as disc drives, nonvolatile solid state memories, or other types of memory, or a combination thereof. The solid state memory 108 may comprise another nonvolatile memory, such as NAND or other types of flash memory, any other type of nonvolatile memory, or a combination thereof. The solid state memory 108 may be used as a cache for the nonvolatile memory 106, for example to store frequently or recently accessed data from the nonvolatile memory 106. For example, the DSD 104 may comprise a hybrid drive, with a disc nonvolatile memory 106 and a solid state flash cache memory 108. For example, nonvolatile memory 106 may be a disc memory, a solid state memory such as single-level or multi-level Flash, another kind of nonvolatile memory, or any combination thereof. In some embodiments, the nonvolatile memory 106 and the solid state memory 108 may employ different access methods to store or retrieve data.

In some embodiments, the solid state memory 108 may have a faster read or write access time than the nonvolatile memory 106. The solid state memory 108 may be used as a cache to store data for faster access than the access speeds to the nonvolatile memory 106. For example, the DSD 104 may receive a data read request from the host 102, and the DSD may check the cache memory 108 first to determine whether it holds the requested data. If it does, the DSD 104 may be able to retrieve the data quickly, while if it does not the DSD may need to retrieve the data from a slower nonvolatile memory 106, and may load the data into the cache 108 in case of future read requests. In another example, the DSD 104 may receive a data write command. The DSD 104 may write the data to the cache memory 108, which may be faster than writing to the nonvolatile memory 106. In this manner, if the data is being frequently updated it may be written to the faster cache 108, and may only be copied to the nonvolatile memory 106 at intervals or at a later time. The reduced latency provided by the solid state memory 108 can improve the overall performance and response times of the DSD 104.

Figure 2:
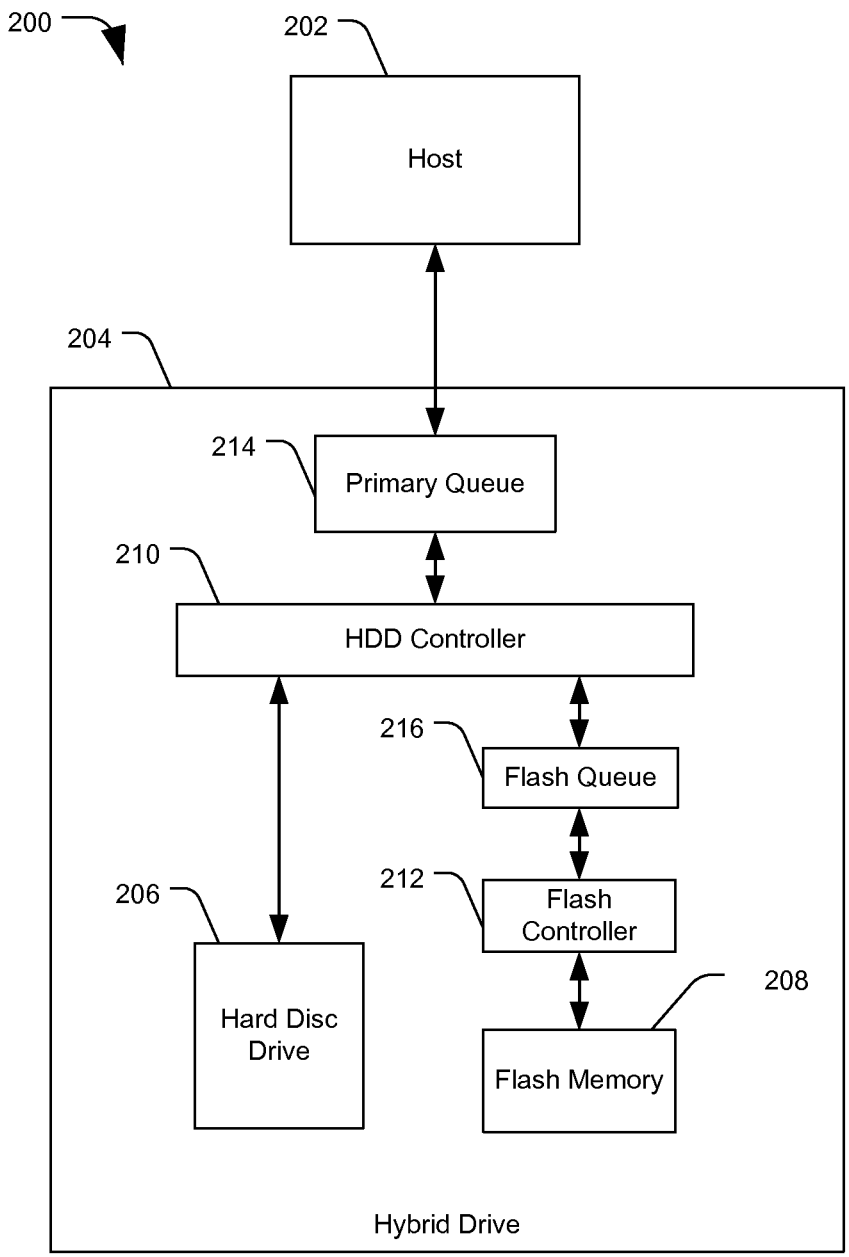
FIG. 2 is a diagram of an another illustrative embodiment of a system including a solid state memory command queue in a hybrid device.

FIG. 2 depicts a diagram of an embodiment of a system including a solid state memory command queue in a hybrid device, generally designated 200. The system 200 may include a host device 202, such as the host 102 shown in FIG. 1. The host 202 may be connected, via a wired or wireless connection, to solid state hybrid drive data storage device (DSD) 204, such as the DSD 104 shown in FIG. 1. The DSD 204 may contain a nonvolatile memory such as a hard disc drive 206, and a nonvolatile solid state memory, such as a NAND Flash memory 208. The DSD 204 may further include an HDD controller 210 and a Flash controller 212 to control access operations to the memories as well as other operations and processes of the DSD 204. In some embodiments, the HDD controller 210 and Flash controller 212 may include one or more circuit devices, and may be integrated into a single unit configured to perform multiple operations. In addition, the DSD 204 may have a primary queue 214 and a Flash queue 216, which may be used to store pending access operations of the DSD 204. The primary queue 214 and Flash queue 216 may be stored in one or more memories such as a dynamic random access memory (DRAM) or static RAM (SRAM) unit.

In an example embodiment, the host 202 may send commands to the DSD 204 over a wired or wireless interface, such as a SATA interface. Commands received by the DSD 204 over the interface may be queued in the primary queue 214. For example, rather than receiving a single command, executing the command, and then returning an "operation complete" response to the Host before receiving a second command, the DSD may instead receive multiple commands and store them in the queue, returning an indication to the host after each that the command has been received successfully and that new commands may be sent. This allows new commands to be received while prior commands are still being executed. This can also help reduce delays due to command overhead, such as for SATA interface commands.

The DSD 204 may receive a given command at the HDD Controller 210, for example by retrieving the oldest received command from the Primary Queue 214. For a data access operation, such as a read or write operation, the HDD Controller 210 may determine whether the operation should be directed to the HDD 206 or the Flash memory 208. If the data operation is directed at the HDD 206, the HDD Controller 210 can access the HDD 206 and then return the result to the host 202 as appropriate.

According to an embodiment of the present disclosure, operations directed towards the Flash memory 208 may be sent to the Flash controller 212, which for example may include a programmable state machine (PSM) for executing Flash-based operations. In a system without a Flash queue 216, the command may be sent to the Flash controller 212, which would access the Flash memory 208 to complete the operation. The Flash controller 212 may then send the results back to the HDD controller 210 before the HDD controller could proceed to a subsequent operation from the primary queue 214. However, in a system with a Flash queue 212 as in the present example, the command may be stored into the Flash queue 216 before execution or before reaching the Flash controller 212.

Figure 4:
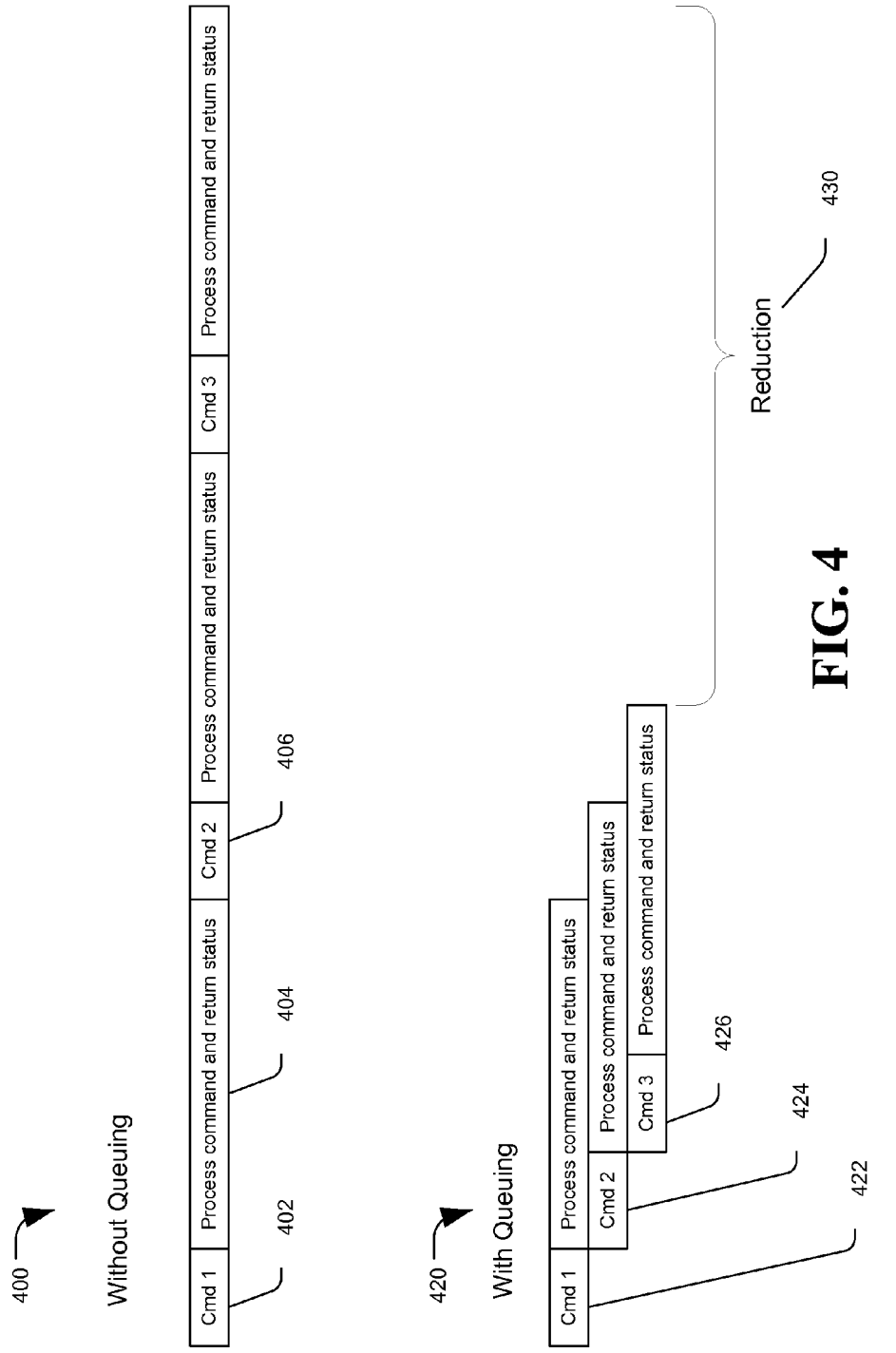
FIG. 4 is a diagram of an illustrative embodiment of a process employing a solid state memory command queue in a hybrid device.

In a multiple command situation this may improve performance in receiving and executing commands, and transferring data from the NAND Flash to the HDD controller by reducing the amount of latency due to multiple commands being sent across the bus. Buffering commands using a Flash cache allows for pipelining as illustrated in FIG. 4.

Figure 3:
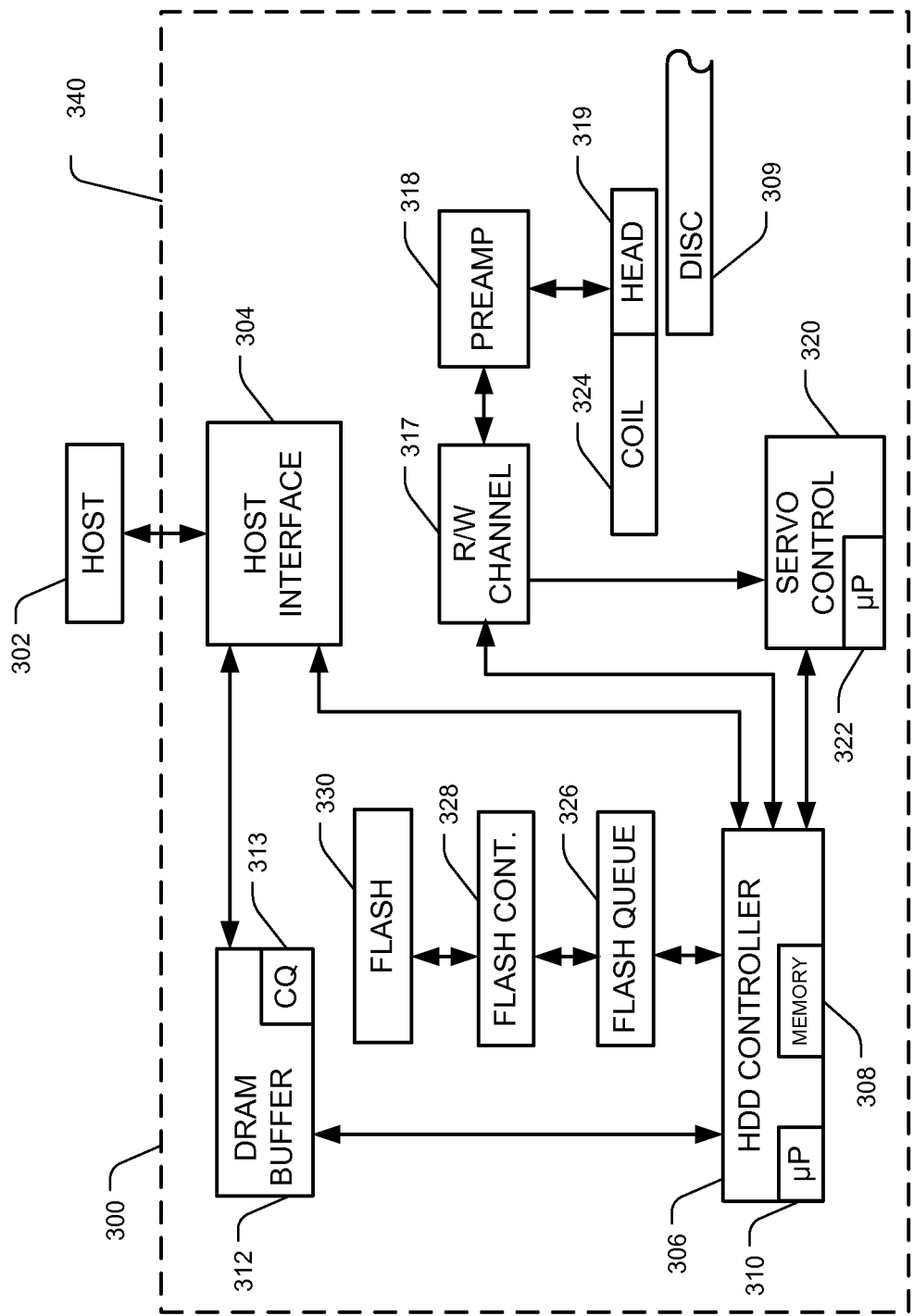
FIG. 3 is a diagram of an another illustrative embodiment of a system including a solid state memory command queue in a hybrid device.

FIG. 3 depicts another diagram of an embodiment of a system including a solid state memory command queue in a hybrid device, generally designated 300. Specifically, FIG. 3 provides a functional block diagram of an example solid state hybrid disc drive data storage device (DSD) 300. The DSD 300 may be a data storage device such as the device 104 shown in FIG. 1. The DSD 300 can communicate with a host device 302 (such as the host system 102 shown in FIG. 1) via a hardware or firmware-based interface circuit 304 that may include a connector (not shown) that allows the DSD 300 to be physically removed from the host 302. In some embodiments, the DSD 300 may have a casing 340 housing the components of the DSD. In some embodiments, the DSD 300 may communicate with the host 302 through the interface 304 over wired or wireless communication. The buffer 312 can temporarily store data during read and write operations, and can include a command queue (CQ) 313 where multiple pending operations can be temporarily stored pending execution. The CQ 313 may correspond to the primary queue 214 shown in FIG. 2. Commands arriving over the interface 304 may automatically be received in the CQ 313 or may be stored there by HDD controller 306, interface 304, or another component. A solid state memory 330 can be included, such as a NAND Flash memory, which for example can be used as a cache to store recently or frequently read or written data. A DSD 300 containing multiple types of nonvolatile storage mediums, such as a disc 309 and Flash 330, may be a hybrid storage device.

The DSD 300 can include a programmable controller 306 (such as the HDD controller 210 of FIG. 2) with associated memory 308 and processor 310. Further, FIG. 3 shows the DSD 300 can include a read-write (R/W) channel 317, which can encode data during write operations and reconstruct user data retrieved from disc(s) 309 during read operations. A preamplifier circuit (preamp) 318 can apply write currents to the head(s) 319 and provides pre-amplification of read-back signals. A servo control circuit 320 may use servo data to provide the appropriate current to the coil 324 to position the head(s) 319. The controller 306 can communicate with a processor 322 to move the head(s) 319 to the desired locations on the disc(s) 309 during execution of various pending commands in the command queue 313. In some embodiments, the Flash 330 may store copies of data already stored on the disc 309, such as data read from the disc and loaded into the cache. At other times, the Flash 330 may contain data not on the disc 309, such as write data that has not yet been recorded to the disc 309.

In an example embodiment, a command is received at the DSD 300 from the host 302 over the interface 304. The interface 304 may comprise any interface that allows communication between a host 302 and a DSD 300, either wired or wireless, such as USB, IEEE 1394, Compact Flash, SATA, eSATA, PATA, SCSI, SAS, PCIe, Fibre Channel, Ethernet, or Thunderbolt, among others. The DSD 300 may be configured to determine the nature of the command and behave accordingly. For example, a read command may result in the DSD 300 determining, e.g using the HDD controller 306, whether the data is in the cache 330 or only on the disc 309, and either retrieving the data from the cache or spinning up the disc if the data was not in the cache. In another example, a write command may result in the DSD 300 writing the data to the cache 330, invalidating any old copies of the same data still existing in the cache, and transferring the write data to the disc 309 at a later point.

In some embodiments, the DSD 300 may further include a Flash queue 326, and a Flash controller 328. In certain embodiments, the Flash queue 326 can be a physically separate memory component from the Flash memory 330. The Flash queue 326 may include a volatile or nonvolatile memory similar to the DRAM buffer 312 with command queue 313, and may be used to store pending operations to the Flash memory 330. In some embodiments, the Flash queue can be stored to the DRAM buffer 312 in addition to the CQ 313. Including a Flash queue may allow the DSD 300 to queue up multiple operations for the Flash memory 330 while other operations are executing, thereby improving latencies and reducing idle time of the Flash memory 330.

The Flash controller 328 may include circuitry, such as a programmable state machine (PSM), to control operations of the Flash memory 330, such as storing or retrieving data. In some embodiments, the HDD controller 306 and the Flash controller 328 may be part of a single circuit running software for performing different functions, such as software for determining whether a command should be directed to disc or flash, software for controlling operations of the disc memory 309, and software for controlling operations of the Flash memory 330. In some embodiments, the HDD controller 306 may be configured to send all Flash commands to the Flash queue 326, and the Flash controller 328 receives commands through the queue 326. In some embodiments, commands may be sent from the HDD controller 306 to the Flash controller 328, and the Flash controller may be configured to begin the operations immediately, or place the command(s) in the Flash queue 326 if the Flash memory is busy. If the command is received and executed or successfully stored into the Flash queue 326, an indicator that the command was successfully received may be returned. If the Flash queue 326 is full, an indicator that the Flash memory is busy may be returned. Other implementations and operations between the Flash memory 330, Flash controller 328, and Flash queue 326 are also possible.

Turning now to FIG. 4, a diagram of an illustrative embodiment of a process employing a solid state memory command queue in a hybrid device is depicted. In a first example 400, a diagram of a system without queuing for a Flash memory is depicted. In the example 400, a first command 402 is received at the Flash memory, and then processed and a status returned at 404. Only after the first command has finished processing can the Flash memory receive a second command 406, and a third command can only be received after processing the second command, and so on. After completing each command, the Flash memory itself may sit idle while the next command is received, resulting in overall inefficiency.

In a second example 420 of FIG. 4, a diagram of a system employing a command queue for the Flash memory is depicted. In this example 420, a first command 422 may be received at the Flash memory and processing can begin. Before the processing of the first command 422 has completed, the Flash may receive a second command 424, which can be queued, and the Flash controller can begin to execute the second command even before the first command has completed. A third command 426 may also be received and queued before the first command 422 has completed. Before the first command 422 has finished processing and a status has been returned, the second command 424 can begin processing with little or no idle time of the Flash memory. A Flash controller may be able to perform operations on each command as it is received and before a previous command has completed, such as determining a physical location in the Flash memory corresponding to a Logical Block Address (LBA) received as part of each command, retrieving data from the Flash, and returning the results of a command. In this manner, the Flash controller may be able to process multiple commands simultaneously; retrieving commands from the Flash command queue as processing availability opens up. By storing commands in a buffer and pipelining operations, a significant reduction 430 in total latency for the three commands can be achieved compared to the example 402 with no Flash queuing.

In some embodiments, the Flash queue may function as a first-in first-out (FIFO) queue, where commands are executed in the order they are received. In other embodiments, queued commands may be performed out of order. For example, as will be explained in more detail with regards to FIGS. 6 and 7, commands may be combined which may result in certain commands being completed in an order different from the order in which they were received. In some embodiments, a DSD may be able to organize the performance of the operations based on an importance or priority of the queued commands. For example, commands may be assigned priority values, and commands originating from user applications may be given priority over commands from system applications.

Figure 5:
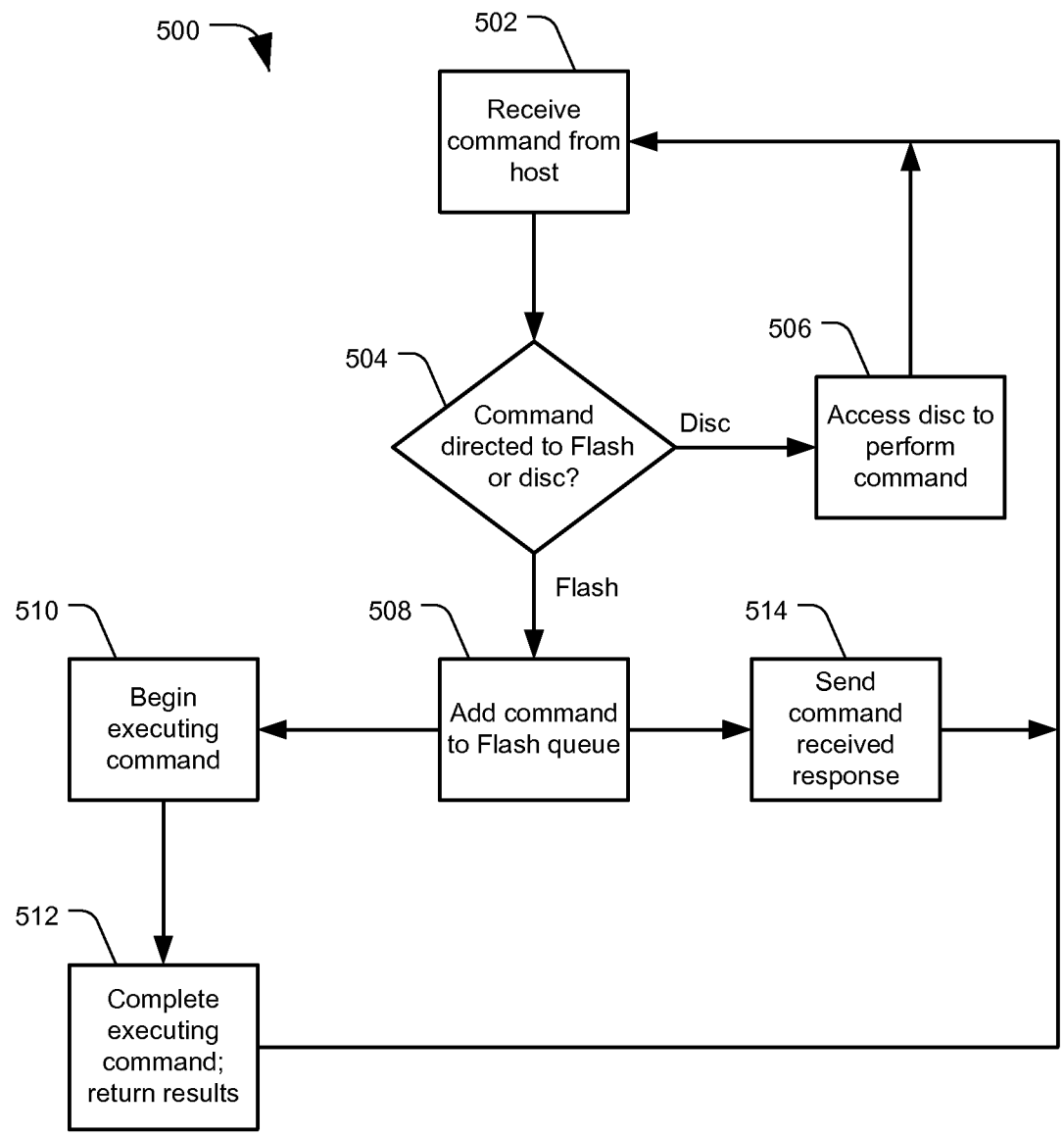
FIG. 5 is a flowchart of an illustrative embodiment of a method employing a solid state memory command queue in a hybrid device.

FIG. 5 depicts a flowchart of an illustrative embodiment of a method employing a solid state memory command queue in a hybrid device, generally designated 500. The method may comprise receiving a command from a host at a data storage device (DSD), at 502. For example, a host may send a command to read or write data to a data storage device over a wired or wireless connection. The command may be received at a controller or processor, which may then direct the command to other memory controllers or to other software modules of the controller or processor.

The method may then comprise determining, for example at a controller of the DSD, whether the command should be directed to a first memory such as a disc memory, or to a second memory such as a solid state NAND Flash memory, at 504. For example, a write command may involve sending the associated data to the Flash memory for storage, which data may then be stored to disc memory at a later time. In some circumstances, write data may be sent directly to disc memory for storage. A read command may involve determining whether the logical block addresses (LBAs) identified in the read command are stored in the Flash memory, or whether they must be retrieved from the disc memory.

When a determination is made to direct the command to the disc memory at 504, the method may comprise accessing the disc memory to perform the command, at 506. For example, the disc may be spun up and data may be written to the disc or read from the disc, with the results returned (e.g. a write complete indication or the read data). After performing the command, or in some embodiments after successfully receiving the command and identifying the target memory, the DSD may return to receiving commands from the host, at 502. For example, the DSD may be able to receive additional commands before completing the previous command.

When a determination is made to direct the command received from the host to the Flash memory at 504, the method may comprise adding the command to a Flash command queue, at 508. In some embodiments, the command may be sent to the Flash controller for execution immediately without being placed in a Flash queue, for example if the Flash memory is idle and can immediately begin processing the command. In other embodiments, the command may be placed into the Flash queue regardless of whether any other commands are being processed at the Flash memory.

Once the command has been placed into the Flash queue at 508, the method may include beginning execution of the command, at 510. For example, the command may be executed immediately if the Flash memory is not already busy, or it may be held pending in the queue until the Flash memory is no longer busy. In some embodiments, a Flash controller may prepare to execute the command even if a previous Flash memory operation has not yet completed. Once the command has been executed, the method may involve returning the results of the operation, for example to a DSD controller or the host device.

After placing the command into a Flash queue at 508, the method may also involve sending a command received response at 514 indicating that the Flash memory has received the command, which may indicate to a DSD controller or host that the additional commands can be sent to the Flash. The command received response may be sent, and additional commands may be received, at the same time or prior to the beginning to execute the command at 510. For example, the command may be placed into the Flash queue at 508, a "command received" response may be sent at 514, and the command may remain pending in the queue while other operations are completed on the Flash memory and additional commands are received and also placed into the Flash queue.

Figure 6:
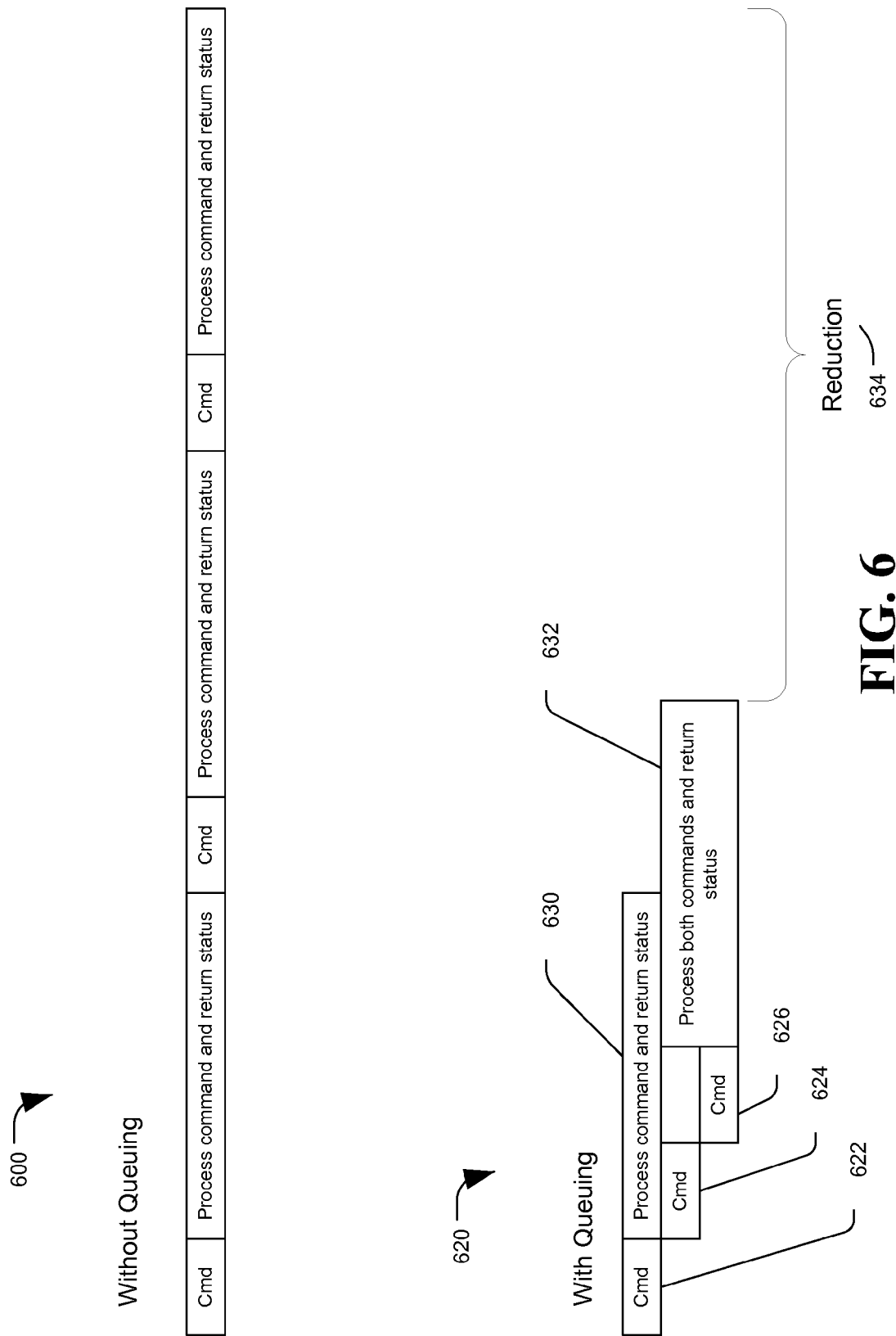
FIG. 6 is a diagram of an illustrative embodiment of a process employing a solid state memory command queue in a hybrid device.

Turning now to FIG. 6, a diagram of an illustrative embodiment of a process employing a solid state memory command queue in a hybrid device is shown. As in FIG. 4, first example 600 depicts a diagram of a system without queuing for a Flash memory. In the example 600, each command is transmitted to the Flash memory only after the previous operation has completed and a status has been returned. This may result in inefficiency as the Flash memory may be idle while commands are being transferred.

There may be additional inefficiencies in some systems employing Flash memory without queuing. In some embodiments, data may be read from Flash memories in increments based on a "page" size of the Flash memory. For example, a Flash page may contain 8 kBytes of data, 16 kBytes, or some other increment. In some system architectures, a DSD may be configured to stripe multiple pages together, so that two or more pages are read together, leading to an effective read size of 16 kBytes, 32 kBytes, or some other multiple of Flash page sizes. However, host requests for data may be in increments smaller than the Flash read entity. For example, a host may request only 4 kBytes of data from a DSD with each read command, while the DSD may be configured to read 8 or 16 kBytes at a time. In such embodiments, the Flash controller may only send 4 kBytes of data to the HDD or DSD controller, and subsequently to the host, and discard all the read data except for the requested 4 kBytes. The host may subsequently send another read request for another 4 kBytes of data that was located in the same Flash entity that was just read and discarded. This can lead to operational inefficiency in a DSD as the same Flash page may need to be read multiple times in a short amount of time.

The second example 620 of FIG. 6 depicts a system including a Flash queue and that may be configured to read larger data entities from the Flash memory than is requested by a host command in a single operation. In example 620, a first command 622 may be received at a Flash memory, which may then begin processing the command at 630. While the first command 622 is processing, a second command 624 and third command 626 may be received and placed into a Flash queue. The Flash controller may determine that the second command 624 and third command 626 are both read requests for data contained in a single Flash data entity. For example, both commands may be read commands for 4 kBytes of data stored on the same Flash page of 16 kBytes. After determining the second command 624 and third command 626 can be coalesced, the Flash controller may perform a single read operation 632 on the Flash page containing the data for both the second command 624 and third command 626, and return the data for both. Rather than executing two read operations for the two commands, a single operation may be performed. This can create a significant reduction 634 in the response time for the received operations by combining the benefits of queuing commands while other commands are completed, and by combining commands into fewer operations on the Flash memory.

In some embodiments, a DSD may be configured to queue a set number of commands before beginning operations in order to maximize the benefits of combining commands. For example, a DSD may wait until eight commands are queued for the Flash memory before executing the commands, so that related commands can be combined into fewer operations. Related commands need not be received in sequence. For example, if six commands are in the Flash queue, the Flash controller may identify that the first and fifth commands are read requests for the same Flash readable data entity. Both commands can be completed in the same operation, removing both the first and fifth commands from the Flash queue. In some embodiments, the DSD may only wait a short period of time to determine if additional operations will be received, so that commands are not left pending in the Flash queue for long.

In some embodiments, multiple write commands may also be combined to be written to the Flash memory in one operation, rather than in multiple write operations. In some embodiments, the Flash may be used to store recent data from reads or writes, and write commands may be combined into a single write operation. The writes do not need to be restricted to the same LBA range. Multiple write commands, all in distinct LBA ranges, can be written to the Flash in a single operation. In some embodiments, a set of writes can be grouped together such that there is no wasted space in the Flash, such as may arise from aligning individual writes to Flash page boundaries. This can improve Flash usage efficiency as well as performance, since the write speeds may be faster.

Figure 7:
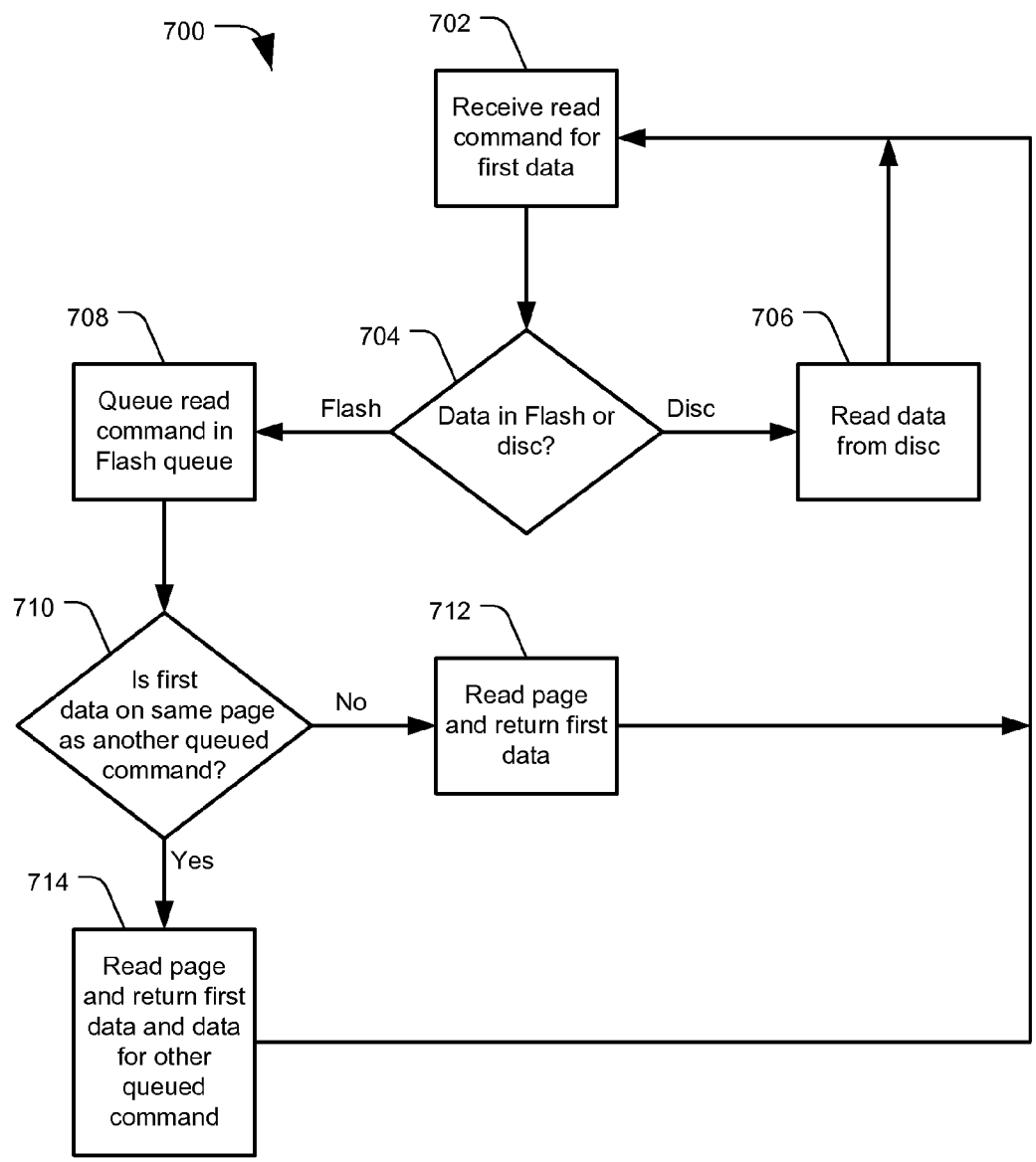
FIG. 7 is a flowchart of an illustrative embodiment of a method employing a solid state memory command queue in a hybrid device.

FIG. 7 depicts a flowchart of an illustrative embodiment of a method 700 employing a solid state memory command queue in a hybrid device. The method 700 may include receiving a read command for a first unit of data, at 702. For example, this may include receiving a read command from a host at a hybrid data storage device to retrieve a specific chunk of data, such as a 4 kByte unit of data associated with one or more logical block addresses (LBAs).

The method may then include determining whether the requested data is in the Flash memory (for example, in a solid state cache of NAND Flash memory), or if the data is only located on the disc memory, at 704. If the data is to be retrieved from the disc at 704, the method may involve reading the data from the disc at 706. The DSD may store a copy of the read data to the Flash memory, and return the requested data to the host device, and await further commands at 702. If the requested data is already located in the Flash at 704, the method may include placing the read command into a Flash queue, at 708.

The method 700 may involve determining if the requested first unit of data is located on the same readable Flash entity as the data associated with another queued read command, at 710. For example, the Flash controller may determine if the first unit of data is on the same Flash page as other requested data, or in embodiments where multiple Flash pages are read at a time, whether the first data is on the same set of striped pages as other requested data. If the first unit of data is not on the same Flash read entity as other requested data, the method may involve reading the page containing the first data and returning it to the host, at 712. This may happen after prior pending operations in the Flash queue are completed first.

If it is determined that the first unit of data is on the same Flash entity as other requested data, the method may involve reading the Flash page or entity containing both the first data and the other data associated with another queued command, and returning both sets of data to the host, at 714. The determination of 710 on related commands may be performed when each new command is received, such that a given command may be combined with a prior command in the queue, or it may be combined with a later-received command. For example if a command is combined with a prior queued command, the command may be executed "out of turn" and the data retrieved earlier than it would have been if each command was executed in turn according to when it was placed into the queue.

The methods of FIGS. 5 and 7 are example embodiments, and variations may be made without departing from the scope of the present disclosure. For example, commands besides read commands may be combined, such as write commands as described in regards to FIG. 6. Other types of memories may be used besides disc memories and Flash memories. Other variations are also possible.

In accordance with various embodiments, the methods described herein may be implemented as one or more software programs running on a computer processor or controller device. In accordance with another embodiment, the methods described herein may be implemented as one or more software programs running on a computing device, such as a personal computer that is using a data storage device such as a disc drive. Dedicated hardware implementations including, but not limited to, application specific integrated circuits, programmable logic arrays, and other hardware devices can likewise be constructed to implement the methods described herein. Further, the methods described herein may be implemented as a computer readable storage medium or device, such as hardware components storing instructions that when executed cause a processor to perform the methods. Instructions for performing the methods disclosed herein may also be broadcast to a device for execution using computer readable transmission media.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Moreover, although specific embodiments have been illustrated and described herein, it should be appreciated that any subsequent arrangement designed to achieve the same or similar purpose may be substituted for the specific embodiments shown.

This disclosure is intended to cover any and all subsequent adaptations or variations of various embodiments. Combinations of the above embodiments, and other embodiments not specifically described herein, will be apparent to those of skill in the art upon reviewing the description. Additionally, the illustrations are merely representational and may not be drawn to scale. Certain proportions within the illustrations may be exaggerated, while other proportions may be reduced. Accordingly, the disclosure and the figures are to be regarded as illustrative and not restrictive.

What is claimed is:

1. An apparatus comprising:
 a data storage
  device including:
   a first nonvolatile solid state memory;
   a second nonvolatile memory having a slower access speed than the first nonvolatile solid state memory;
   a first command queue configured to receive all data access commands from a host device;
   a second command queue configured to store commands directed to the first nonvolatile solid state memory;
   a first controller configured to:
    receive a first data access command from the first command queue;
    determine which of the first nonvolatile solid state memory and the second nonvolatile memory the first data access command is directed to;
    when the first data access command is directed to the first nonvolatile solid state memory, store the first data access command to the second command queue;
   a solid state memory controller configured to receive the first data access command from the second command queue and execute the first data access command to access the first nonvolatile solid state memory; and
   the second command queue interposed between the first controller and the solid state memory controller and configured to intercept data access commands directed to the solid state memory controller.

2. The apparatus of claim 1 further comprising:
 the first controller further configured to:
  after storing the first data access command to the second command queue, send an indication that the first data access command has been received and that additional commands may be sent to the first controller.

3. The apparatus of claim 1 further comprising:
 the first controller further configured to:
  receive a second data access command directed to the first nonvolatile solid state memory before execution of the first data access command has completed; and
  store the second data access command to the second command queue.

4. The apparatus of claim 3 further comprising:
 the first controller further configured to:
  store a third data access command to the second command queue;
 the solid state memory controller further configured to:
  determine if both the second data access command and the third data access command can be performed with a single data access; and
  perform the single data access based on the determination.

5. The apparatus of claim 1 further comprising:
 an interface configured to receive commands from the host device; and
 the first controller further configured to return results of commands to the host device over the interface.

6. The apparatus of claim 1 further comprising:
 the first nonvolatile solid state memory is a NAND Flash memory; and
 the second nonvolatile memory is a disc memory.

7. The apparatus of claim 1 further comprising:
 a data access command is directed to the first nonvolatile solid state memory when the data access command requests data stored in the first nonvolatile solid state memory or when the data access command includes data to be written to the first nonvolatile solid state memory.

8. The apparatus of claim 1 further comprising:
 the solid state memory controller further configured to perform a plurality of read or write data access operations stored in the second command queue on the first nonvolatile solid state memory based on a priority value associated with each of the plurality of data access operations.

9. The apparatus of claim 1 further comprising:
 the first command queue and the second command queue include volatile random access memory; and
 the second command queue is physically separate from the solid state memory controller.

* * * * *